United States Patent
Angehrn

(10) Patent No.: US 6,709,214 B1
(45) Date of Patent: Mar. 23, 2004

(54) FIXING ELEMENT ADAPTED TO BE MANUALLY PUSHED INTO POSITION FOR FIXING INSULATING STRIPS OR PLATES ON A SOLID SUBSTRUCTURE

(75) Inventor: Beda Angehrn, Au (CH)

(73) Assignee: SFS intec Holding AG, Heerbrugg (CH)

( * ) Notice: Subject to any disclaimer, the term of this patent is extended or adjusted under 35 U.S.C. 154(b) by 0 days.

(21) Appl. No.: 09/979,671

(22) PCT Filed: Apr. 3, 2000

(86) PCT No.: PCT/EP00/02958
§ 371 (c)(1),
(2), (4) Date: Nov. 6, 2001

(87) PCT Pub. No.: WO00/68581
PCT Pub. Date: Nov. 16, 2000

(30) Foreign Application Priority Data

May 6, 1999 (DE) .................................. 299 08 107 U

(51) Int. Cl.⁷ ................................................ F16B 43/00
(52) U.S. Cl. ........................................ 411/533; 411/999
(58) Field of Search ................................ 411/533, 480, 411/396, 999, 352, 353

(56) References Cited

U.S. PATENT DOCUMENTS

| | | | | |
|---|---|---|---|---|
| 410,697 A | * | 9/1889 | Rogers | ........................ 411/412 |
| 2,831,520 A | * | 4/1958 | Clarke | |
| 3,841,472 A | | 10/1974 | Fuller et al. | |
| 4,162,728 A | | 7/1979 | Uzumcu et al. | |
| 4,349,106 A | | 9/1982 | Bögel | |
| 4,640,524 A | * | 2/1987 | Sedlmair | |
| 4,712,959 A | * | 12/1987 | Hasan | |
| 4,881,861 A | * | 11/1989 | Hewison | |
| 4,884,932 A | * | 12/1989 | Meyer | |
| 4,930,630 A | | 6/1990 | Habermehl | |
| 5,066,181 A | * | 11/1991 | Bogel | |
| 5,082,412 A | * | 1/1992 | Thomas | |
| 5,265,998 A | | 11/1993 | Kluser | |

FOREIGN PATENT DOCUMENTS

| | | |
|---|---|---|
| DE | 3509490 | 9/1986 |
| DE | 29503202 | 4/1995 |
| DE | 9411222 | 9/1998 |
| EP | 0783063 | 7/1997 |

OTHER PUBLICATIONS

Grün GmbH, Flachdachbefestiger . . . (English translation: Flat roof fastener . . . ) 4pages.

DIN 7504, Mechanische Verbindungselemente . . . (English translation: Mechanical connecting elements) p. 2, Table 1, Form Q, Dec. 1983.

* cited by examiner

Primary Examiner—Flemming Saether
(74) Attorney, Agent, or Firm—Volpe and Koenig, P.C.

(57) ABSTRACT

This invention relates to a fixing element (1) for fixing insulating strips (5) and optionally, additional sealing strips (6) on a solid substructure (7). A screw (4) and a large-surface washer (2) with a tubular extension (3) are used. A rib (15) that projects radially inward into the displacement area is provided in a partial section of the tubular extension (3), which accommodates a screw bead (11) in such a way that it is axially displaceable. After passing the rib (15) in the direction of the free end of the tubular extension (3), the screw head (11) can rest on the rib in the direction opposite to the screwing-in direction.

7 Claims, 4 Drawing Sheets

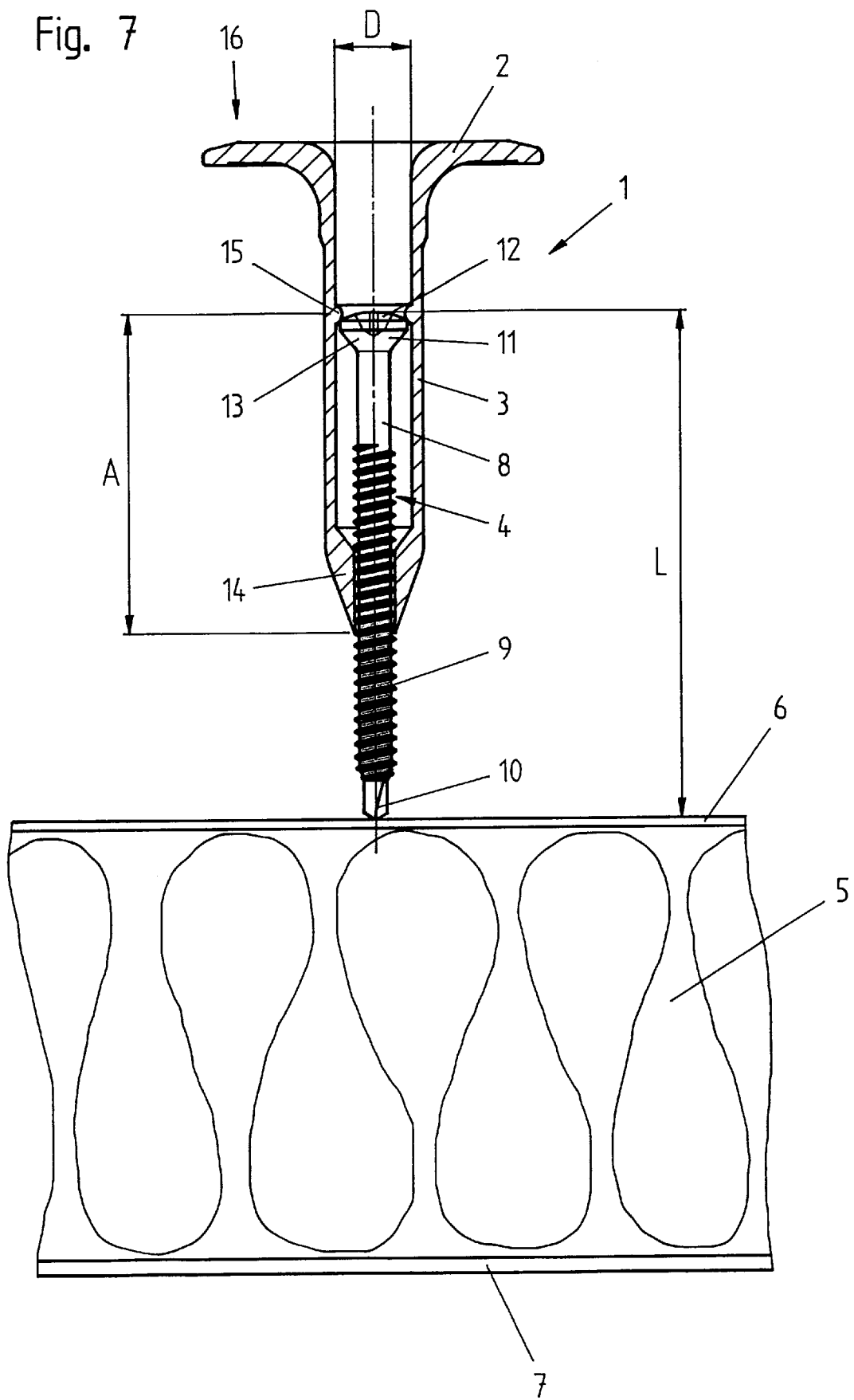

FIXING ELEMENT ADAPTED TO BE MANUALLY PUSHED INTO POSITION FOR FIXING INSULATING STRIPS OR PLATES ON A SOLID SUBSTRUCTURE

BACKGROUND

The invention relates to a fixing element for fixing insulating strips or plates and optionally additional sealing strips on a solid substructure.

Such fixing elements, as well as their availability in a preassembled state, are already known in many varied configurations. In a preassembly of the fixing elements, the screws are inserted in the fixing elements. Then, the fixing elements are processed by means of automatic setting machines, in which a screwdriver bit directly provides the axial advance of the screw as well as the insertion of the fixing element into a roofing strip.

BRIEF SUMMARY OF THE INVENTION

In relatively small roofing structures or during the fixing of insulation strips or plates, it is desirable that the fixing elements be pre-inserted by hand in a preassembled state, i.e. pushed by hand into the insulating strips or plates and optionally into additional sealing strips. Such pushing-in can also be advantageous when it is followed by processing with a setting machine.

One embodiment of the fixing element of the present invention is adapted for use with a screw which is provided with a thread over at least a portion of the length of its shaft and which has a screw head. The fixing element preferably includes a large-surface area washer having a tubular extension that defines a passage for receiving the screw. The tubular extension includes at least one rib to preferably allow the fixing element and screw to be pushed into insulation.

The object of the present invention is to substantially improve the handling potential during pre-insertion of a fixing element of the previously described kind.

In accordance with the invention, this is achieved by providing, in the segment of the tubular extension for axially displaceable reception of the screw head, at least one rib which protrudes radially inward into the displacement region, or one or more burls or the like, against which the screw head can abut after surmounting the ribs, burls or the like in a direction which is opposite to that of the screwing-in direction toward the free end of the tubular extension.

The screws are preassembled in a tubular extension of the large-area washer by pushing-in the screw head past an appropriate obstacle (rib, burl or the like), whereby the rib, burl or the like forms an abutment for pushing the completed fixing element into insulating strips or plates and potentially also into sealing strips. Due to the large-area washer, there is available a relatively large hand-hold for mounting the fixing element, and that is so independently of whether insertion is by hand or by means of a setting tool, so that the force transfer, during pushing into the insulating strips or plates and optionally additionally into sealing strips, can be carried out without any problem. Nevertheless, there is the assurance that the screw cannot move all the way into the tubular extension, but rather encounters a limiting member in the form of a rib, a burl or the like. Even with relatively forceful pushing-in of the preassembled fixing element, the force exerted upon the large-area washer is transmitted by the rib, burl or the like to the screw head and thereby to the inserted screw. This also ensures that the boring or penetrating tip formed at the free end of the screw always lies at the most forward point of the preassembled fixing element, whereby the pre-insertion of the fixing elements is facilitated.

One kind of embodiment contemplates that the rib, burl or the like is formed near the mid-range of the length of the tubular extension. By so doing, the screw can slide axially inside the tubular extension over a relatively wide range, which creates a telescopic effect. A telescopic effect is especially appropriate for use of the fixing element in the roof area, i.e. when walk-on surfaces are to be provided with such fixing elements. When stepping on such a fixing element, the large-area washer with the tubular extension can move downwardly in the axial direction and then back again into the initial position, through the elastic action of the insulating strips or plates.

A preferred embodiment is one in which there is provided an annular rib extending around the entire inside wall. In a preassembly, this rib can not be easily surmounted, because the preassembly of large-area washers having tubular extensions and screws is usually performed with appropriate assembly tools which provide the required force. If the fixing elements are then pre-inserted by hand, there exists the assurance that the screw head can no longer surmount the complete annularly closed rib, i.e. a firm abutment exists.

It is preferable that the spacing of the rib, burl or the like from the free end of the tubular extension is less than the overall length of the screw including a boring portion formed at its free end. This provides assurance that, in the condition in which the screw head abuts against the rib, burl or the like, the free end of the screw and especially its boring portion still always protrudes beyond the free end of the tubular extension. This substantially facilitates penetration by the fixing element during pre-insertion.

It also contributes to simple mounting capability and optimal abutting during pre-insertion, if the screw head is lens-shaped and its transition to the shaft has a truncated cone shape. In such a case, it is possible during preassembly to easily push the screw head over the projecting rib, burl or the like. Nevertheless, the lens-shaped configuration of the top of the screw head assures an optimal abutment.

The configuration of the preassembled fixing elements, in accordance with the invention, creates the additional possibility that several washers having a tubular extension which are contiguous to each other, or which follow each other closely, are connected to each other by webs or tapes into a kind of screw strip. This makes it substantially easier for transportation and pre-insertion at the construction site. In this connection, the joined-together washers can also be made so as to be relatively easy to separate from each other.

In theory, it is conceivable that the respective screws can be mounted in the tubular extension of the washers just before pre-insertion. Preferably, however, the screws are already preassembled in the tubular extensions of the large-area washers, i.e. each screw head is already pushed in past the rib, burl or the like at the internal limit of the tubular extension, so that the rib, burl or the like serves as abutment for the screw head. By such preassembly, loss prevention is additionally provided, because both during transportation and during their use at the construction site, the screws can not fall out of the tubular extensions of the large-area washers.

BRIEF DESCRIPTION OF THE DRAWINGS

Additional inventive characteristics and special advantages are further explained in the following description with reference to the drawings wherein:

FIG. 7 shows a section through a fixing element upon pre-insertion in an insulating strip or plate with an additional sealing strip.

DETAILED DESCRIPTION OF THE INVENTION

Figure 1:
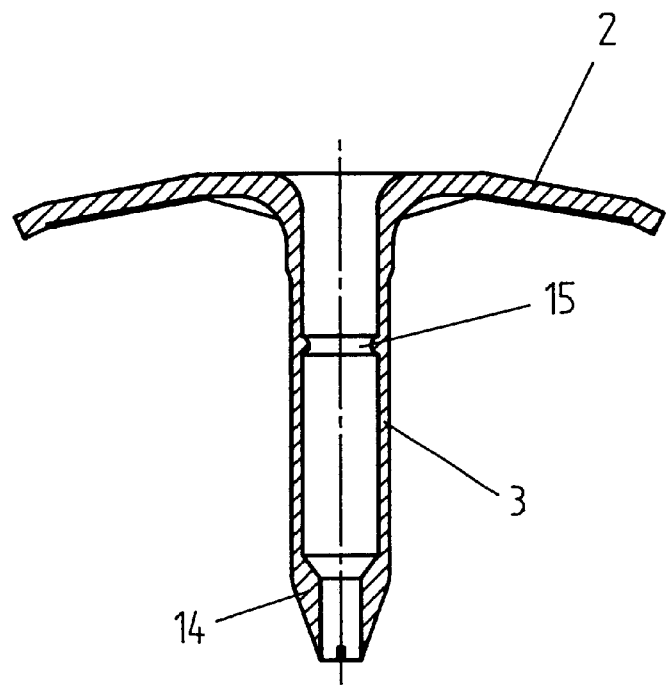
FIG. 1 shows a section through a washer with tubular extension along the line 1—1 in FIG. 2.
Figure 2:
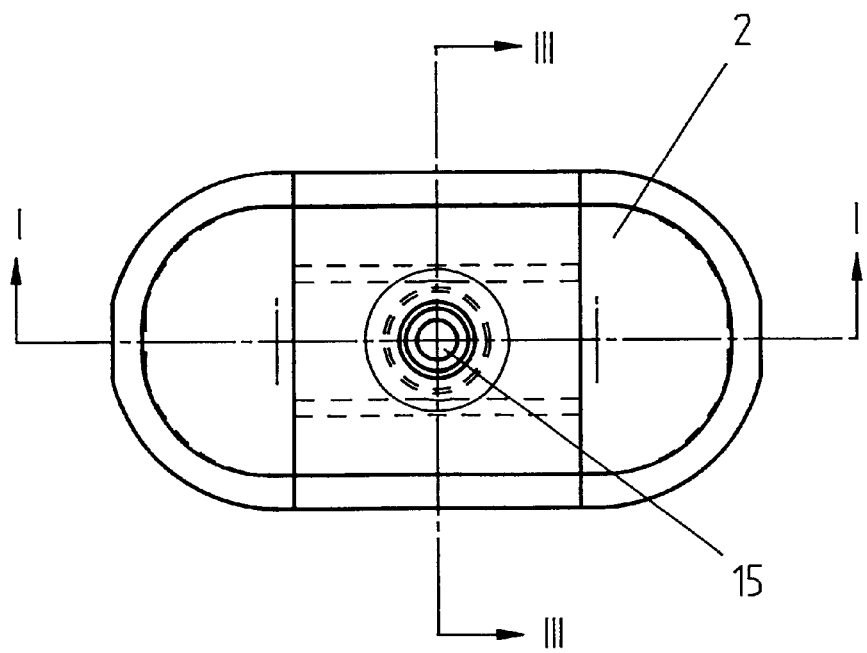
FIG. 2 shows a top view of a large-area washer.
Figure 3:
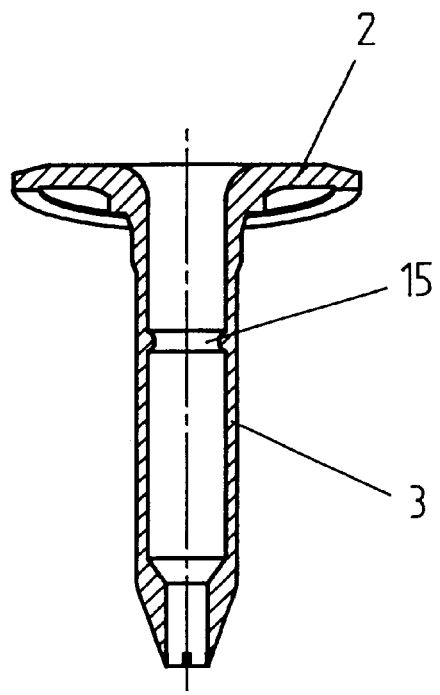
FIG. 3 shows a section along line 3—3 in FIG. 2.
Figure 4:
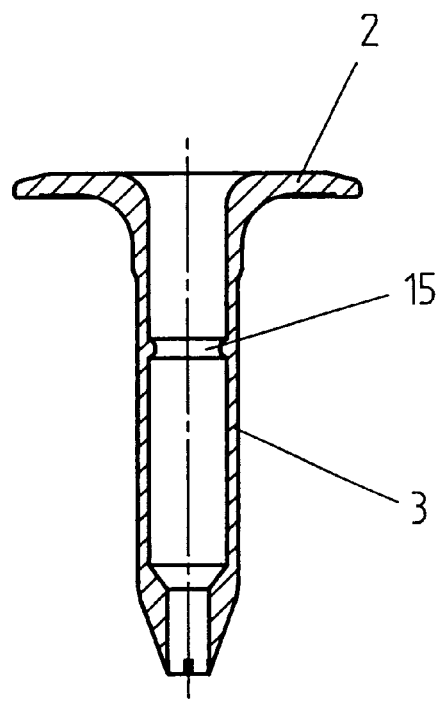
FIG. 4 shows a longitudinal section through a large-area washer with tubular extension, in which the large-area washer is of substantially circular form.

The drawings show two different embodiments of large-area washers, namely washers of elongated shape on the one hand, and washers of circular shape on the other hand. However, the configuration of the washers 2 has no bearing on the present invention, so that the description also does not differentiate between them in this regard. Basically, all possible shapes are available. Thus, it is also possible to manufacture the large-area washer 2 and an extension 3 connected to it as separate components, which are subsequently joined firmly together or else are interlocked by interlocking shapes or friction. The washers 2 as well as their tubular extension 3 are usually made of plastic. It is also possible to make the tubular extension 3 of plastic and the large-area washer 2, of metal, for example.

The fixing element 1 consists of a large-area washer 2 having a tubular extension 3 and a screw 4. By means of such a fixing element 1, insulating strips 5 or plates and potentially additional sealing strips 6 are to be fixed on a solid substructure. The screw 4 is provided with a thread 9 over at least a portion of the length of its shaft 8, a boring portion 10 being formed at the free end of the screw 4 for penetration into the substructure 7. At the other end, the screw 4 has a screw head 11, whose top side 12 is lens-shaped. The underside 13 of the screw head is shaped like a truncated cone.

The tubular extension 3 has, at least over a large segment of its length, an inner cross-section sufficiently large for the rotational reception and axial displacement of the screw head 11, i.e. an appropriately large diameter D. At the end of the tubular extension 3 facing away from the washer 2 there is formed an end segment 14 with a pass-through opening, which permits passage of the shaft 8 of screw 4 or of the thread 9 on shaft 8.

In the segment of the tubular extension 3 in which the screw head 11 is axially displaceable, there is provided a rib 15 which extends radially inward into the slidable region, and which limits the range of movement of the screw head 11. During preassembly of screw 4 in the tubular extension 3, the screw head 11 is pushed downwardly across rib 15 in the direction toward the free end of the tubular extension 3. As soon as the screw head 11 has surmounted the obstacle formed by rib 15, rib 15 forms an abutment for the screw head 11 oriented against the screwing-in direction. In other words, the screw is restrained inside the tubular extension 3 oppositely to the screwing-in direction.

The preassembly is performed by appropriate tools or instruments such that the force required to overcome the projecting rib 15 presents no problem. Since the tubular extension 3 customarily consists of plastic, the rib 15 is elastically depressed during pushing-past of the screw head 11. This is also promoted by shaping the underside of the screw head as a truncated cone transition. Thus it is quite possible that rib 15 extends in continuous circumferentially closed form around the entire portion of the interior wall.

Rib 15 is formed approximately in the middle of the length of the tubular extension. Depending on the length of screw 4, or depending on the desired telescoping capability between the tubular extension 3 and the screw 4, rib 15 can be formed either nearer to the free end of tubular extension 3, or nearer to the large-area washer 2. However, care must be taken that the distance A of rib 15 from the free end of tubular extension 3 is smaller than the overall length L of the screw including the boring portion 10 formed at its free end. This ensures that at least the boring portion 10, but also portions of shaft 8 bearing thread 9, will protrude beyond the free end of tubular extension 3.

If a fixing element 1 of the preassembled type shown in FIG. 7 is available, the large-area washer 2 can be grasped by hand, for example, and then the boring portion 10 and with it also an appropriate corresponding segment of shaft 8 of screw 4, can be pushed into the sealing strip 6 and the insulating strip 5 by pressing downwardly in the direction of arrow 16. This enables pre-insertion of the fixing element 1 and its ultimate setting thereof by means of a driving-in tool. During pushing-in, rib 15 forms an abutment for screw head 11, so that the force exerted during pushing down on the large-area washer 2 is transmitted to the screw head 11 and with it also to the free end of screw 4. A preassembled fixing element 1 can also be processed advantageously in a setting machine. In that case, the projecting screw can sometimes be pushed into the substructure even before the screwdriver bit is operatively connected to the screw.

Such fixing elements 1 are preferably already preassembled during their manufacture, by inserting screws 4 into the tubular extension 3 of the large-area washers 2. By the application of appropriate force, the screw head 11 can be pushed past the constriction formed by rib 15, whereupon rib 15 serves as abutment for the screw head in one direction of movement. Nevertheless, a telescope-like movement is possible between screw 4 and the tubular extension 3. By virtue of this, handling during pre-insertion is substantially improved, and loss prevention for the screw is also provided.

Figure 5:
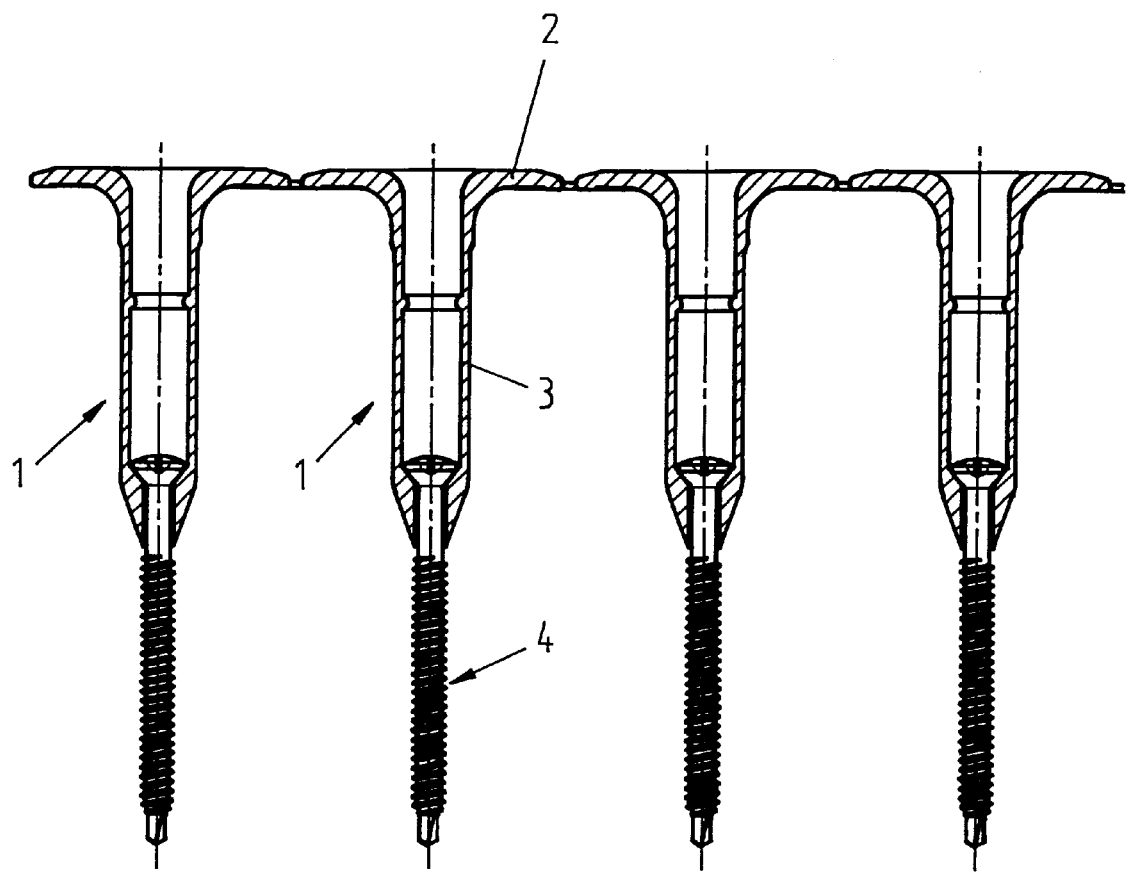
FIG. 5 shows a section through several fixing elements in which screws are preassembled in the tubular extension of the large-area washers, with the fixing elements connected to each other in the manner of an screw strip.
Figure 6:
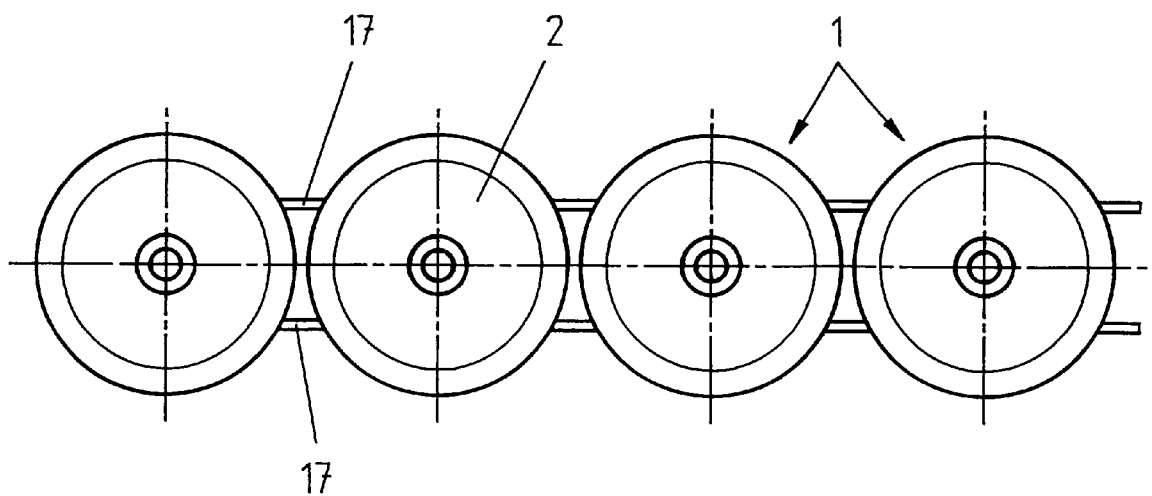
FIG. 6 shows a top view of the screw strip according to FIG. 5.

From FIGS. 5 and 6 it can be seen that several fixing elements can be connected to each other either contiguously or following each other at a small distance, into a kind of screw strip. In the example shown, mutual connections in the regions of large-area washers 2 are provided by webs 17 or tapes.

The foregoing description always referred to a rib 15 extending radially inward. However, it is also entirely possible to provide more than one rib 15. In such a case, the screw head can be preassembled, for example between two ribs 15, with the spacing of the ribs determining the range of axial movement between screw and tubular extension. Within the scope of the invention, there also exists the possibility of utilizing, instead of ribs, merely one or more burls, which can perhaps be surmounted more easily during preassembly of the screws but which provide nevertheless an adequate abutment during pre-insertion of the completed fixing element. To facilitate pushing-in of the screw head and nevertheless make an appropriately strong abutment against reverse movement, one possible adaptation is to provide the ribs, burls or the like with special cross-sectional shapes.

What is claimed is:

1. A preassembled fixing element for fixing insulation on a solid substructure, the fixing element having a screw with a lens-shaped screw head and a shaft with a thread over at least a portion thereof, the fixing element comprising:

a large-surface area washer defining a hole;

a tubular extension disposed on the large-surface area washer around the hole to define a passage which is sufficiently large to receive the screw head therein, the tubular extension having an end segment, located opposite to the large-surface area washer, the end segment being configured to permit the passage of the shaft of the screw and to prevent the passage of the screw head therethrough, at least one rib disposed within the tubular extension, the at least one rib protruding radially inwardly into the passage; and wherein the at least one rib is shaped and dimensioned relative to the screw head so as to prevent the screw head from passing the at least one rib when moving toward the large-surface area washer, whereby, with the screw head positioned between the at least one rib and the end segment, the screw is adapted to be driven into the insulation by pushing the large-surface area washer toward the insulation via the at least one rib contacting the screw head.

2. The fixing element according to claim 1, wherein the at least one rib is formed generally medially along a length of the tubular extension.

3. The fixing element according to claim 1, wherein the at least one rib comprises an annular ring.

4. The fixing element according to claim 1, wherein the at least one rib is spaced from the end segment by a distance less than an overall length of the screw.

5. The fixing element according to claim 1, wherein the screw head has a convex outwardly facing portion and includes a transition between the convex outwardly facing portion and the shaft that has a truncated cone shape.

6. The fixing element according to claim 1, wherein a plurality of large-surface area washers are connected to each other and each have a tubular extension disposed thereon, the plurality of large-surface area washers forming a screw strip.

7. The fixing element according to claim 1, further comprising the screw disposed within the fixing element with the screw head located between the at least one rib and the end segment.

* * * * *